(12) United States Patent
Pyun et al.

(10) Patent No.: US 12,304,987 B2
(45) Date of Patent: May 20, 2025

(54) HIGH VERDET CONSTANT NANOPARTICLES AND METHODS FOR PRODUCING AND USING THE SAME

(71) Applicant: Arizona Board of Regents on Behalf of the University of Arizona, Tucson, AZ (US)

(72) Inventors: Dong-Chul "Jeffrey" Pyun, Tucson, AZ (US); Robert A. Norwood, Tucson, AZ (US); Nicholas George Pavlopoulos, Tucson, AZ (US); Kyle Carothers, Tucson, AZ (US); Lindsey Holmen, Tucson, AZ (US); Tobias Kochenderfer, Tucson, AZ (US); Nicholas Lyons, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 609 days.

(21) Appl. No.: 17/435,645

(22) PCT Filed: Mar. 4, 2020

(86) PCT No.: PCT/US2020/021014
§ 371 (c)(1),
(2) Date: Sep. 1, 2021

(87) PCT Pub. No.: WO2020/180999
PCT Pub. Date: Sep. 10, 2020

(65) Prior Publication Data
US 2022/0153902 A1 May 19, 2022

Related U.S. Application Data

(60) Provisional application No. 62/813,719, filed on Mar. 4, 2019, provisional application No. 62/813,734, filed on Mar. 4, 2019.

(51) Int. Cl.
*C08F 292/00* (2006.01)
*G02F 1/00* (2006.01)
(Continued)

(52) U.S. Cl.
CPC .......... *C08F 292/00* (2013.01); *G02F 1/0036* (2013.01); *H01F 1/11* (2013.01); *G02F 1/09* (2013.01)

(58) Field of Classification Search
CPC ........ H01F 1/11; H01F 1/0054; H01F 1/0063; G02F 1/0036
See application file for complete search history.

(56) References Cited

U.S. PATENT DOCUMENTS

| 7,691,285 B2 | 4/2010 | Teller et al. |
| 9,378,880 B2 | 6/2016 | Gangopadhyay et al. |

(Continued)

FOREIGN PATENT DOCUMENTS

WO    WO-2011016891 A2 *  2/2011  ............. B82Y 25/00

OTHER PUBLICATIONS

Kumar et al. "Nanocomposites with Polymer Grafter Nanoparticles", Macromolecules, 46, (2013); pp. 3199-3214.*
Bull et al. "Synthesis of ferromagnetic polymer coated nanoparticles on multi-gram scale with tunable particle size", Journal of Materials Chemistry, 20, (2010); pp. 6023-6025.*
Wu et al. "Peculiar porous α-Fe2O3, γ-Fe2O3 and Fe3O4 nanospheres: Facile synthesis and electromagnetic properties", Powder Technology, vol. 269, (2015); pp. 443-451.*

(Continued)

*Primary Examiner* — Prashant J Khatri
(74) *Attorney, Agent, or Firm* — Foley & Lardner LLP (57) ABSTRACT

The present invention provides a composition comprising a plurality of magnetic nanocomposite particles. The magnetic nanocomposite particle comprises a magnetic metallic nanoparticle and a plurality of organic polymer ligands attached to its surface. The composition can also include a host matrix, such as a polymer, in which the magnetic nanocomposite particles are interspersed therein. The compositions of the invention have the Verdet constant of at least 5000°/T-m.

3 Claims, 4 Drawing Sheets

(51) Int. Cl.
    *G02F 1/09*     (2006.01)
    *H01F 1/11*     (2006.01)

(56) References Cited

U.S. PATENT DOCUMENTS

| | | | |
|---|---|---|---|
| 2003/0224214 A1* | 12/2003 | Garito | H01F 1/0063 |
| | | | 428/692.1 |
| 2005/0205851 A1* | 9/2005 | Sugawara | H01F 10/005 |
| | | | 252/514 |
| 2016/0140991 A1 | 5/2016 | Chen et al. | |

OTHER PUBLICATIONS

Gai, "Synthesis, Characterization and Application of Block Copolymer and Nanoparticle 1-18 and 26-28 Composites"; Doctoral Dissertations 998, University of Massachusetts Amherst (May 2017).
International Search Report and Written Opinion for PCT/US2020/021014 dated Jul. 9, 2020.
Lin et al., "Nanoparticle-Driven Assembly of Block Copolymers: A Simple Route to Ordered 1-18 and 26-28 Hybrid Materials"; Journal of the American Chemical Society, vol. 133, Issue 17 (May 2011 ), p. 6513-6516.
Swager, "50th Anniversary Perspective: Conducting/Semiconducting Conjugated Polymers. A 1-18 and 26-28 Personal Perspective on the Past and the Future"; Macromolecules, vol. 50, Issue 13 (Jun. 2017), p. 4867-4886.

* cited by examiner

HIGH VERDET CONSTANT NANOPARTICLES AND METHODS FOR PRODUCING AND USING THE SAME

CROSS-REFERENCE TO RELATED APPLICATIONS

This application is a U.S. National Stage Patent Application under 35 U.S.C. § 371 of PCT Patent Application No. PCT/US20/21014, filed Mar. 4, 2020, entitled "High Verdet Constant Nanoparticles and Methods For Producing and Using the Same," which claims the priority benefit of U.S. Provisional Application Nos. 62/813,719, filed Mar. 4, 2019 and 62/813,734, filed Mar. 4, 2019, all of which are incorporated herein by reference in their entirety.

STATEMENT REGARDING FEDERALLY FUNDED RESEARCH

This invention was made with government support under grant number D17PC$_{00302}$ awarded by DARPA. The government has certain rights in the invention.

FIELD OF THE INVENTION

The present invention relates to a composition comprising a plurality of magnetic nanocomposite particles. The magnetic nanocomposite particle comprises a magnetic metallic nanoparticle and a plurality of organic polymer ligands attached to its surface. The composition can also include a host matrix, such as a polymer, in which the magnetic nanocomposite particles are interspersed therein.

BACKGROUND OF THE INVENTION

Recently, nanocomposite materials comprising magnetic nanoparticles embedded in a non-magnetic "host matrix" have attracted significant interest. A "nanocomposite" material refers to a material comprising nanoparticles embedded in, suspended in, or otherwise structurally associated with a different "host material," such as an organic polymer. An important group of these materials includes magneto-optic (MO) nanocomposites, which exhibit magneto-optical behavior under defined conditions. For example, MO properties of composites comprising nanoparticles of Fe, Co, $\gamma$-$Fe_2O_3$, $Fe_3O_4$, $CoFe_2O_4$, and metallic alloys such as, FeCo, FePt, CoPt in various host materials including organic polymers, silica gels, colloidal silica particles, glass, and ion-exchange resins have been previously reported.

Typically, magnetic nanoparticles used in MO nanocomposites are paramagnetic, superparamagnetic, ferromagnetic, or a combination thereof. MO nanocomposites offer possibilities of exploiting the magnetic and/or optical properties of the nanoparticles and the processability of the host material. MO-active nanocomposites can be used in magnetic field sensors, integrated and bulk optical isolators, optical circulators, polarizers, rotators, high-speed MO modulators, information storage (e.g., as used in data-storage devices comprising MO-active nanocomposite media), as well as other applications known to one skilled in the art.

Although the properties of isolated single-domain magnetic nanoparticles are relatively well understood, the competition between single-particle responses and correlation effects produced by nanocomposites of such particles continues to be an area of intense research. One challenge in assembling a magnetic nanocomposite material is achieving a uniform dispersion of the nanoparticles in the host material with minimal clustering of the magnetic nanoparticles. These magnetic nanoparticles thermodynamically favor the formation of aggregates which greatly compromises composite properties when dispersed into a matrix forming material. Rigidification of the host material inhibits migration and aggregation of the nanoparticles. But, many problems remain with conventional methods for producing nanocomposite materials, especially such materials having particular functional properties. Nanoparticle aggregation is particularly deleterious to optical applications as it leads to high levels of optical scattering that limit optical transmission.

One method of overcoming such problems is disclosed in a commonly assigned U.S. Pat. No. 9,378,880 ("the '880 Patent"), which is incorporated herein by reference in its entirety. However, using the method disclosed in the '880 Patent, it is relatively difficult to control the overall size of the polymer shell.

Some of the problems associated with current MO nanocomposites and methods for producing the same are (i) it is difficult to control both the magnetic and optical properties. Nanocomposite particles having a large magnetic strength have a correspondingly high Verdet constant. However, nanocomposites with high magnetic strength tend to aggregate due to magnetic attraction. This aggregation reduces transparency (i.e., in UV-Vis, in particular in visible wavelength) of these nanocomposite materials.

Therefore, there is a need for nanocomposite particle composites with the high Verdet constant without reduced optical transmission properties, and methods for producing the same. In addition, there is a need for a method for preparing magnetic and magneto-optical nanocomposite particles that can increase and allows correlation of a Faraday rotation and magneto-optical properties.

SUMMARY OF THE INVENTION

Some aspects of the invention are based on the discovery by the present inventors of methods for producing nanocomposite particles that allow one to control the interparticle spacing between nanocomposite particles when these materials are cast into films (e.g., polymer matrix) or other free standing device components. This feature allows control of the degree of interparticle magnetic coupling which affects the magneto-optical properties of these materials. Furthermore, compositions and methods of the invention allows a high number of magnetic nanocomposite nanoparticles to be cast into films or other device components without any significant scattering of visible light (which limits size below 50 nm).

One particular aspect of the invention provides a polymeric composition comprising a plurality of magnetic nanocomposite particles interspersed therein. Each of the magnetic nanocomposite particle comprises a magnetic metallic nanoparticle having a plurality of organic polymer ligands attached to its surface. In some embodiments, the polymeric composition has a Verdet constant of at least about 5,000°/T-m, typically at least about 10,000°/T-m, often at least about 50,000°/T-m, more often at least about 100,000°/T-m, still more often at least about 250,000°/Tm, and most often at least about 500,000°/T-m at 1310 nm wavelength. When referring to a numerical value, the terms "about" and "approximately" are used interchangeably herein and refer to being within an acceptable error range for the particular value as determined by one of ordinary skill in the art. Such a value determination will depend at least in part on how the value is measured or determined, e.g., the limitations of the measurement system, i.e., the degree of precision required for a particular purpose. For example, the term "about" can mean within 1 or more than 1 standard deviation, per the practice in the art. Alternatively, the term "about" when referring to a numerical value can mean±20%, typically ±10%, often ±5% and more often ±1% of the numerical value. In general, however, where particular values are described in the application and claims, unless otherwise stated, the term "about" means within an acceptable error range for the particular value, typically within one standard deviation. The value determination also depends strongly on the optical wavelength used for the measurement; in this document the optical wavelength is 1310 nm unless otherwise noted.

In some embodiments, the magnetic nanocomposite nanoparticles are encapsulated or surround in a polymeric composition. The amount of magnetic metallic nanoparticles in the polymeric composition ranges from about 0.1% by weight to about 50% by weight, typically from about 0.1% by wt. to about 25% by wt. and often from about 0.1% by wt. to about 10% by wt.

Still in other embodiments, the magnetic metallic nanoparticle comprises a metal oxide nanoparticle, a complex metal oxide nanoparticle, or a combination thereof. In some instances, the magnetic metallic nanoparticle comprises a paramagnetic metal ion, a ferromagnetic metal, or a combination thereof. In one particular embodiment, the magnetic metallic nanoparticle comprises cobalt ferrite, iron oxide, or a combination thereof.

Yet in other embodiments, the amount of organic polymer ligands attached to each of the magnetic metallic nanoparticle is at least about 80% by weight, typically at least about 85% by weight, often at least about 90% by weight, more often at least about 95% by weight, still more often at least about 98% by weight, and most often at least about 99% by weight.

In other embodiments, the thickness of said organic polymer ligands attached to each of said magnetic metallic nanoparticle is at least about 2 nm, typically at least about 50 nm, often at least about 100 nm, still more often at least about 150 nm, and most often at least about 200 nm. Alternatively, in some embodiments the thickness of said organic polymer ligands attached to each of said magnetic metallic nanoparticle ranges from about 1 nm to about 500 nm, typically from about 2 nm to about 400 nm, often from about 2 nm to about 300 nm, and most often from about 2 nm to about 200 nm.

In further embodiments, said magnetic metallic nanocomposite particles are homogeneously interspersed within said polymeric composition.

Still in yet other embodiments, the average interparticle spacing between said magnetic nanocomposite particles is at least about 2 nm, typically at least about 5 nm, often at least about 10 nm, more often at least about 50 nm, and most often at least about 100 nm.

In other embodiments, the mean particle size of the magnetic metallic nanoparticle ranges from about 1 nm to about 1,000 nm, typically from about 1 nm to about 500 nm, often from about 2 nm to about 500 nm, more often from about 2 nm to about 100 nm, and most often from about 5 nm to about 20 nm. Alternatively, the d50 mean particle size of the magnetic metallic nanoparticle is about 50 nm or less, typically 40 nm or less, often 30 nm or less, more often 25 nm or less, still more often 10 nm or less, and most often about 5 nm.

Yet in other embodiments, the organic polymer ligand is covalently attached to the surface of said magnetic metallic nanoparticle.

In one particular embodiment, said organic polymer ligand comprises poly(methyl methacrylate), polystyrene, DOPA, and a combination thereof.

Still in further embodiments, said polymeric composition has at least about 5% transparency in the wavelength range from about 400 nm to about 700 nm.

In further embodiments, said polymeric composition has at least about 5% transparency in the wavelength range from about 700 nm to about 1550 nm.

Another aspect of the invention provides a magneto-optical device comprising a unit of magnetic nanocomposite particle as described herein. The terms "as described herein" and "as disclosed herein" are used interchangeably and incorporates by reference the broad embodiment or definition as well as any and all narrower embodiments or definitions disclosed in the present disclosure.

In some embodiments, said magneto-optical device is selected from the group consisting of a magneto-optical isolator, a magnetic-field sensor, a magnetic photonic crystal, a magnetic data-recording device, magneto-optical circulator, magneto-optical modulator, magneto-optical switch, and a magnetometer.

Still another aspect of the invention provides a method for producing a magnetic nanocomposite particle comprising a magnetic metallic nanoparticle and a plurality of organic polymers attached to the surface of said magnetic metallic nanoparticle, said method comprising:

reacting a magnetic nanocomposite particle comprising a plurality of first organic ligands with a second organic ligand under conditions sufficient to produce a magnetic nanocomposite particle comprising a plurality of said second organic ligand attached on the surface of said magnetic metallic nanoparticle; and reacting said magnetic nanocomposite particle comprising a plurality of said second organic ligand with a polymerizing agent under conditions sufficient to produce said magnetic nanocomposite particle comprising said plurality of organic polymers attached to the surface.

In some embodiments, said polymerization comprises atom transfer radical polymerization reaction.

Still in other embodiments, said magnetic metallic nanoparticle has a mean particle size in the range of from about 2 nm to about 100 nm, typically from about 5 nm to about 75 nm, and often from about 10 nm to about 50 nm.

In one particular embodiment, the total amount of said organic polymers attached to the surface of said magnetic metallic is at least about 90% by weight, typically at least about 95% by wt., often at least about 98% by weight of said magnetic nanocomposite particle.

Yet in other embodiments, said first organic ligand comprises polystyrene, oleic acid, or a mixture thereof.

In further embodiments, said second organic ligand comprises a polymerizable functional group that is adapted for a surface initiated polymerization reaction with said polymerizing agent. In one particular embodiment, said polymerizable function group comprises a halogenated alkyl group.

Still in further embodiments, said polymerizing agent comprises acrylates and derivatives thereof, styrene and derivatives thereof. As used herein, the term "derivatives" thereof refers to those having substituents that are well known to one skilled in the art. For example, derivatives of acrylates include substituted acrylates, optionally substituted methacryates, etc., and derivatives of styrenes include optionally substituted styrenes, where the substitution may be on the aromatic ring system (e.g., halides, such as chlorides, bromides, fluorides, alkyls, such as methyl, ethyl, isopropyl, t-butyl, etc., cyano, esters, amines, carboxylates etc.) or on the vinyl group (e.g., alkyl, such as methyl, halides such as fluoride, etc.). In one particular embodiment, said polymerizing agent comprises $C_1$-$C_{18}$ alkyl (meth) acrylate, aromatic containing methacrylates, styrene and derivative thereof, poly(ethylene glycol) methyl ether methacrylate (PEGMA), or a mixture thereof.

Yet in other embodiments, said magnetic nanocomposite particle has a Verdet constant of at least about 5000°/T-m at 1310 nm wavelength, typically at least about 10,000°/T-m, often at least about 50,000°/T-m, more often at least about 100,000°/T-m, still more often at least about 250,000°/Tm, and most often at least about 500,000°/T-m at 1310 nm wavelength.

Further aspects of the invention provides a solid substrate comprising (i) a solid substrate layer and (ii) a plurality of thin layers of a polymeric composition as disclosed herein, wherein each thin layer of said polymeric composition disclosed herein is separated by a separation film. The separation film is a nonmagnetic film that is used to separate two layers of the polymeric composition of the invention.

In some embodiments, said solid substrate layer comprises a material selected from the group consisting of glass, cellulose acetate, polystyrene, polycarbonate, polyacrylate, polymethacrylate, polyester, polyimide, polyamide, polycarbonate, perfluoropolymer, cyclic olefinic copolymer, and a cellulose derived polymer.

Yet other aspects of the invention provide, a method for producing a solid substrate described herein, said method comprising:
(a) placing a solution of a polymeric composition described herein in a solvent to the surface of said solid substrate layer;
(b) evaporating the solvent to produce a layer of said polymeric composition described herein;
(c) placing a solution of a separation film material in a solvent to said layer of polymeric composition described herein produced in said step (b);
(d) evaporating the solvent to produce a separation film on top of said layer of polymeric composition described herein;
(e) placing another solution of said polymeric composition described herein in a solvent to said separation film produced in said step (d);
(f) evaporating the solvent to produce another layer of said polymeric composition described herein; and
(g) optionally repeating said steps (c) and (f) to produce a desired number of said polymeric composition described herein layers on said solid substrate layer.

DETAILED DESCRIPTION OF THE INVENTION

Prior to the discovery by the present inventors, one of the biggest problems of the conventional magneto-optic (MO) nanocomposite particles and methods for producing them was that the more magnetic nanoparticles ("NPs") present, particularly with increasing magnetic moment, aggregation of these NP occurred. As expected, aggregation of MO nanocomposite particles resulted in lowering of magnetic-optic properties due to light scattering and reduced optical transmittance.

The present invention overcomes this and other problems associated with conventional MO nanocomposite particles and methods for producing the same by allowing production of high magnetic nanocomposite particles having a plurality of relatively large organic polymer ligands that are attached to the surface of the magnetic metallic nanoparticles. Without being bound by any theory, it is believed that the presence of a plurality of organic polymer ligands on the surface of the magnetic metallic nanoparticles prevents aggregation of magnetic metallic nanoparticles, thereby significantly mitigating the optical transparency reduction observed in conventional MO nanocomposite particles.

In particular, by using a covalently bound monolayers having initiators for controlled radical polymerizations (for example, via atom transfer radical polymerization "ATRP"), magnetic nanocomposite particles are demonstrated that have a strong magnetic property but low aggregation due to the presence of a high density and length of the grafted organic polymer ligands.

Figure 1:
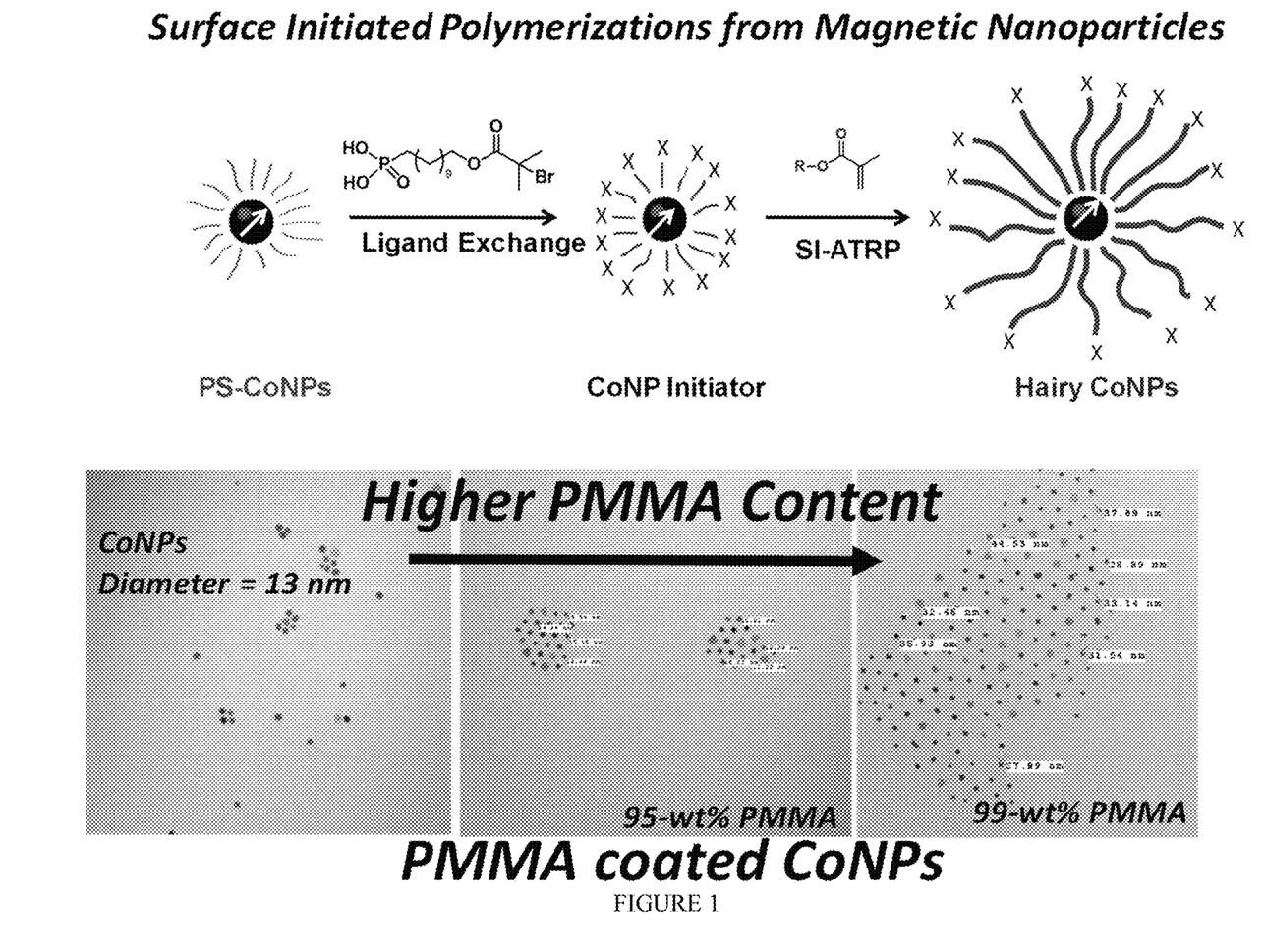
FIG. 1 is a schematic illustration of one particular method for producing magnetic nanocomposite particles of the present invention via surface initiated polymerizations and transmission electron microscopy imaging of cobalt nanoparticles initially with 2 nm polystyrene coating and after ligand exchange and surface initiated polymerization with poly (methyl methacrylate) coatings.

One particular schematic illustration of a method for producing magnetic nanocomposite particles of the invention is provided in FIG. 1. Methods of the invention combines process that allows control of the size, magnetic and magneto-optical properties of magnetic metallic nanoparticles, e.g., from 10-50 nm, along with new processes that allow covalently attaching high density of end-tethered organic polymer ligands, e.g., via surface initiated polymerizations. Accordingly, methods of the invention allow control of composition of the MO nanocomposite particles, interparticle spacing between magnetic metallic nanoparticles, and/or morphology of the composition. Since larger magnetic metallic nanoparticles have a higher magnetic moment by increasing the size of the organic polymer ligands the present invention allows for a composition having heretofore unachieved high Verdet constant without sacrificing the optical properties due to light scattering and/or reduced light transmittance. Unless explicitly stated, by light it is meant electromagnetic radiation of IR and UV-Vis range, typically electromagnetic radiation of wavelength from about 400 nm to about 2000 nm, often from about 500 nm to about 1700 nm, and more often from about 800 nm to about 1600 nm. Furthermore, unless otherwise stated, the Verdet constant refer to herein are in reference to operation at wavelength of 1310 nm.

Typically, the invention provides MO nanocomposite particles having a high magnetic moment with a significant reduction in visible light scattering relative to conventional nanocomposite particles. Furthermore, the invention allows a significantly high volume fraction of magnetic nanocomposite particles in a polymer matrix.

Figure 2:
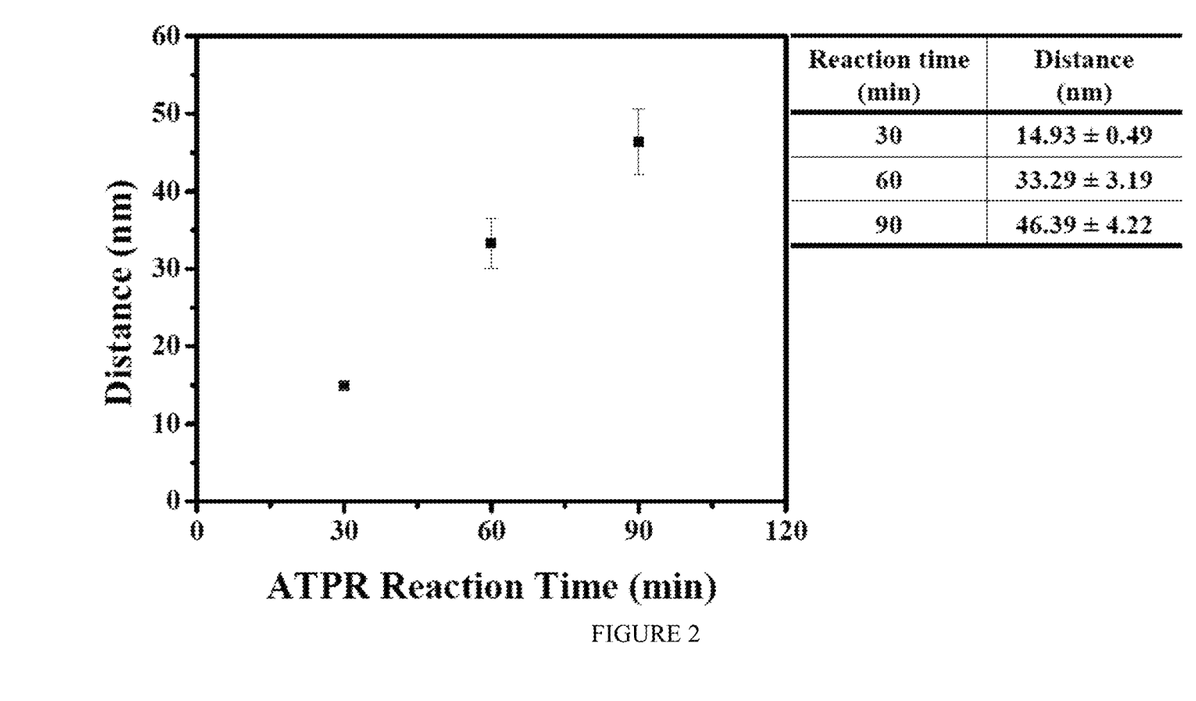
FIG. 2 is a graph showing effects of reaction time on the distance between the poly(methyl methacrylate) ("PMMA") coated cobalt nanoparticles after atom transfer radical polymerization reaction.

Referring to FIG. 1, methods for producing magnetic nanocomposite particles of the invention include the steps of first producing magnetic nanocomposite particles having a first organic ligand (A in FIG. 1), and replacing the first organic ligand with a second organic ligand (B in FIG. 1), and adding reacting the second organic ligand with a polymerizing agent under conditions sufficient to produce the magnetic nanocomposite particle (C in FIG. 1) of the invention. Magnetic nanocomposite particles having a first organic ligand can be produced by methods described by the present inventors in *J. Mater. Chem.*, 2010, 20, 6023, which is incorporated herein by reference in its entirety. The size of the magnetic nanocomposite particles can be readily controlled by the amount of polymerization with the polymerizing agent. As a representative example, it was found that using cobalt nanoparticles of mean average particle size of 13 nm and using methyl methacrylate as the polymerizing agent, the size of the magnetic nanocomposite particles produced depended on the amount of reaction time which effects the amount of polymerization. Thus, for example, as shown in FIG. 2, the distance between each nanoparticle increased with increasing reaction time.

As expected the reaction time which affects the distance between each nanoparticles also affect the total weight of polymer attached to the nanoparticles. Thus, at 30 min. reaction time (FIG. 2), the total amount of polymer attached to the nanoparticles was 95% by weight. At 60 min. reaction time, the amount of organic polymeric ligands on the nanoparticles was 99% by weight. The latter magnetic nanocomposite particle has the Verdet constant of about 100,000°/T-m.

Atom transfer radical polymerizations (ATRP) are well known to one skilled in the art. In general, any known ATRP initiator can be used to propagate the radical polymerization reaction to produce the magnetic nanocomposite particles of the invention. The polymerizing agent can be any compound that includes an unsaturated carbon-carbon bond, typically a carbon-carbon double bond. Exemplary polymerizing agents that can be used in the present invention include, but are not limited to, (meth)acrylated based compounds (e.g., methyl methacrylate or any other alkyl (meth)acrylate compounds, as well as polyethylene glycol methacrylates), styrene, styrene derivatives (such as those with substitution on the phenyl group and/or styrene having an alkyl group branch on the carbon-carbon double bond, etc.), as well as other polymerizable compounds having an unsaturated carbon-carbon bond.

As shown above, the reaction time affects the amount of polymerization. Thus, one can control the interparticle distance between the magnetic metallic nanoparticles. In one specific example, PMMA-coated cobalt nanoparticles having 99% by weight PMMA, the mean interparticle distance was 33.29+3.19 nm. This material also had the Verdet constant of about 100,000°/T-m. By controlling the polymerization reaction time (and in turn the amount of polymers), one can readily tune the interparticle distance between the magnetic metallic nanoparticles (i.e., the "core" of the nanocomposite particles). Such a control also allows one to change the Verdet constant of the material.

Typically, with methyl methacrylate, it was found that polymerization to produce the organic polymer ligand to from about 1,000 to about 1,000,000 g/mol in MW provides suitable magnetic nanocomposite particles.

The first organic ligand is typically polystyrene or a small molecule ligand, such as, oleic acid. However, because the first organic ligand is weakly bound to the metallic nanoparticles, it is often desired to affect a ligand exchange reaction to replace the first organic ligand with a second organic ligand that can be attached to the metallic nanoparticles more tightly. Typically, the second organic ligand forms a covalent bond with the metallic nanoparticles. In this manner, the interparticle spacing can be more readily controlled. Exemplary second ligand compounds of the invention include a compound of the formula $X^1$—$R^1$-$X^2$—$C(=O)$-$R^2$—$X^3$, wherein $X^1$ is —$PO_3H_2$ or catechol; $R^1$ is $C_2$-$C_{20}$ alkyl, aryl (e.g., optionally substituted phenyl, naphthyl, anthracyl, etc.), or heteroalkyl (e.g., alkyl group having one or more ether linkages); $X^2$ is O; $R^2$ is —$C(CH_3)_aH_b$, where a is 1 or 2, and b is 1 (when a is 1) and b is 0 when a is 2, and $X^3$ is a halide (such as chloride or bromide), α-haloester, or benzyl. It should be appreciated that the second organic ligand is not limited to the compound(s) disclosed herein. In general, any compound that forms a covalent bond with the magnetic metallic nanoparticle and having an atom transfer radical polymerization site (or functional group) can be used. Such compounds are well known to one skilled in the art.

The magnetic nanocomposite particles of the invention are produced from a magnetic metallic nanoparticle and an organic polymer ligand. By generating the organic polymer ligand separately or independently from the magnetic metallic nanoparticles, one can readily control the size (e.g., molecular weight of the polymer or the degree of polymerization) of the organic polymer ligand.

Another aspect of the invention provides a composition comprising a plurality of magnetic nanocomposite particles. Each of the magnetic nanocomposite particle comprises a magnetic metallic nanoparticle having a plurality of organic polymer ligands attached thereto. In some embodiments, unlike the methods disclosed in the '880 Patent, methods of the present invention can be used in magnetic particles that are not capable of a UV-surface initiated polymerization. Accordingly, a wide variety of magnetic-optic nanocomposite particles can be produced compared to the method disclosed in the '880 Patent. In fact, methods of the present invention do not require a UV-surface initiation in order to attach organic polymer ligand to the metal-oxide nanoparticles.

The present invention also provides a magneto-optical device comprising a unit of magnetic nanocomposite particle disclosed herein. In some embodiments, the magneto-optical device is selected from the group consisting of a magneto-optical isolator, a magnetic-field sensor, a magnetic photonic crystal, a magnetic data-recording device, magneto-optical circulator, magneto-optical modulator, magneto-optical switch, and a magnetometer.

Another aspect of the invention provides a magnetic-nanoparticle-polymer composite (MNPC) material comprising a plurality of magnetic nanocomposite particles of the present invention and a polymer matrix layer, wherein the plurality of magnetic nanocomposite particles are homogenously dispersed within the polymer matrix layer.

One particular aspect of the present invention provides a composition comprising a plurality of magnetic nanocomposite particles. In some embodiments, the magnetic nanocomposite particles are homogenously distributed within a host matrix. As used herein, the terms "homogeneous" and "homogeneously distributed" mean that while there may be some local variation in the amount of magnetic nanocomposite particles within a host matrix, in general, the magnetic nanocomposite particles are relatively uniformly distributed within a host matrix. Thus, in some embodiments, within 1 cm² area (or within 1 cm³ volume) of a host matrix, the variation of the amount of magnetic nanocomposite particles between two different areas of the host matrix is about 10% or less, typically about 5% or less, often about 1% or less, and most often about 0.1% or less.

The magnetic nanocomposite particles of the present invention comprise a magnetic metallic nanoparticle having a plurality of organic polymer ligands. It should be appreciated that the term "ligand" refers to an organic polymer molecule that attaches to a central metal atom to form a coordination complex.

The term "magnetic metallic nanoparticle" refers to metal, alloy, or metal oxide nanoparticles that can be ferromagnetic materials, superparamagnetic materials, paramagnetic materials, or a combination thereof. Exemplary ferromagnetic materials that are useful in the present invention include, but are not limited to, magnetite ($Fe_3O_4$), other iron oxides (such as ferric oxide, ferrous oxide), as well as other ferromagnetic metals or metal ions known to one skilled in the art, e.g., Co, Ni, Fe, or magnetic metal alloys (e.g., FePt). Exemplary superparamagnetic materials that are useful in the present invention include, but are not limited to, cobalt ferrite, and other superparamagnetic nanomaterials, metals or metal ions known to one skilled in the art. Exemplary paramagnetic materials that are useful in the present invention include, but are not limited to, metals or metal ions of lanthanides (such as lanthanum, cerium, praseodymium, neodymium, samarium europium, gadolinium, terbium, dysprosium, holmium, erbium, thulium, ytterbium, and lutetium), hafnium, and other paramagnetic metals or ions known to one skilled in the art.

In one particular embodiment, the magnetic metallic nanoparticle comprises a metal oxide nanoparticle, a complex metal oxide nanoparticle, or a combination thereof. Yet in other embodiments, the magnetic metallic nanoparticle comprises cobalt ferrite, cobalt, iron oxides, or a combination thereof.

In some embodiments, the magnetic metallic nanoparticle can also include a doping agent. Typically, a doping agent is added to modify the magneto-optical property. Surprising and unexpectedly, it has been found by the present inventors that in some embodiments, addition of a doping agent results in a non-linear increase in the Verdet constant of the resulting composition. In some instances, the resulting Verdet constant in the presence of the doping agent is at least twice the sum total of the Verdet constant of the two individual components. In other embodiments, the resulting Verdet constant is at least about twice (2×), typically 2.5 times, often at least about 3 times, and more often at least about 3.5 times the expected Verdet constant sum total of the two individual components. Without being bound by any theory, it is believed that this synergistic effect may be due to local fields from superparamagnetic metal oxide creating an amplified paramagnetic response in the low-magnetic field range.

Exemplary doping agents that can be used in the invention include, but are not limited to, paramagnetic metals or metal ions, such as lanthanide metals or metal ions. Lanthanide metals are well known to one skilled in the art and include lanthanum, cerium, praseodymium, neodymium, samarium europium, gadolinium, terbium, dysprosium, holmium, erbium, thulium, ytterbium, and lutetium.

In one particular embodiment, the magnetic metallic nanoparticle is a superparamagnetic metal oxide. In some instances, the superparamagnetic metal oxide is cobalt ferrite.

Another aspect of the invention provides a magnetic nanocomposite particle-polymer composite (MNPC) material (i.e., a magnetic nanoparticle composite composition, sometimes referred to herein as simply a composition) which includes a plurality of magnetic nanocomposite particles of the invention that are homogeneously dispersed in a host matrix. In some embodiments, the host matrix is an organic polymer. Exemplary organic polymers that are useful as a host matrix include polymers that are used as organic polymer ligands, such as a polymer containing a vinyl moiety (i.e., ethylene moiety or containing a C=C bond), such as polymethyl methacrylate (PMMA), polystyrene (PS), and the like. In some embodiments, the host matrix is a polymer derived from one or more monomers such as methylmethacrylate, methacrylic acid, styrene, benzylmethacrylate, dimethylaminomethacrylate, trimethylolpropanetriacrylate, hexylmethacrylate, iso-butylmethacrylate, 3-(trimethoxysilyl)propylmethacrylate, vinylmethacrylate, and other unsaturated comonomers, (e.g., monomers containing a vinyl or a carbon-carbon double bond functional group). It should be appreciated that organic polymers can also be halide derivatives of those listed herein. Halide derivative refers to where one or more hydrogen atoms are replaced with halogen atoms such as fluorine, chlorine, etc. Furthermore, halide derivative can be perhalide derivative, where all of the hydrogen atoms attached to carbon atoms are replaced with halogens, such as perfluoro-derivatives, perchloro-derivatives, etc.

In some embodiments, the magnetic nanocomposite particles are produced by combining a magnetic metallic nanoparticle with organic polymers to form nanocomposite particles of magnetic metallic nanoparticles having organic polymer ligands attached or adsorbed thereto. These magnetic nanocomposite particles are then displaced within the host matrix to produce a magnetic-nanoparticle-polymer composite (or magnetic nanocomposite polymer composition). In some embodiments, the host matrix is presented as a solution and the magnetic nanocomposite particles are dispersed therein. A solid MNPC composition is then formed by evaporating the solvent, thereby encapsulating the magnetic nanocomposite particles within the host matrix. Alternatively, the host matrix is allowed to form a covalent bond with the organic polymer ligand of the magnetic metal nanocomposite particles. For example, by forming a bond between a vinyl group (or a carbon-carbon double bond) that is present on the organic polymer ligand with a functional group (such as a vinyl group) of the host matrix using a free-radical polymerization reaction. Optionally, a doping agent can also be added to the mixture to produce an MNPC composition comprising a mixture of magnetic nanocomposite particles and doping agents that are homogeneously dispersed within the host matrix.

In some embodiments, the molecular weight of the organic polymer ligand ranges from about 500 g/mol to about 1,000,000 g/mol, typically from about 1,000 g/mol to about 500,000 g/mol, and often from about 1,000 g/mol to about 100,000 g/mol.

In some embodiments, the mean particle size of the magnetic nanocomposite particle ranges from about 1 nm to about 1,000 nm, typically from about 1 nm to about 500 nm, often from about 2 nm to about 500 nm, and most often from about 2 nm to about 100 nm. Alternatively, the d50 mean particle size of the metallic nanoparticle is about 50 nm or less, typically 40 nm or less, often 30 nm or less, more often 25 nm or less, still more often 10 nm or less, and most often about 5 nm.

Another aspect of the invention provides a composition that is a film, an electronic component, a photonic component, a magneto-optic sensor component, or other molded, fabricated device component. The composition includes magnetic nanocomposite particles that are dispersed in a host matrix. As stated above, typically the magnetic nanocomposite particles are homogeneously dispersed within the host matrix or the polymer.

The composition can optionally also include a doping agent as described herein. If present, in some embodiments the amount of magnetic nanocomposite particles to the doping agent ranges from about 1 wt % to about 50 wt %.

In another embodiment, the amount of magnetic nanoparticle in the composition of the invention can range from as low as about 1% to as high as about 50%. Typically, however, when present the amount of magnetic nanoparticle that is present in the composition of the invention ranges from about 1% to about 40%, typically from about 2% to about 30%, often from about 2% to about 25%, and more often from about 2% to about 20%. When present, the amount of doping agent is present in the composition of the invention, the amount of doping agent ranges from about 1% to about 40%, typically from about 1% to about 30%, often from about 1% to about 25%, and more often from about 1% to about 20%. It should be appreciated that the percentages refer to % by weight. The remaining weight being that of the host matrix.

Yet in other embodiments, the composition of the invention has the extinction coefficient of at most about 1000 $cm^{-1}$, typically at most about 100 $cm^{-1}$, often at most about 1 $cm^{-1}$, and more often at most about 10 cm' in the visible region, e.g., from about 400 nm to about 700 nm λ. Still in other embodiments, the composition of the invention has the extinction coefficient of at most about 100 $cm^{-1}$, typically at most about 10 $cm^{-1}$, and often at most about 0.1 $cm^{-}$, and more often at most about 1 $cm_{-1}$ in the near infrared region, i.e., from about 700 nm to about 1650 nm λ.

Compositions of the present invention can be fabricated by a wide variety of methods known to one skilled in the art. For example, the composition can be molded, extruded, or spun into a thin film to form a wide variety of magneto-optic or electronic components.

Yet another aspect of the invention provides a magneto-optical device comprising a unit of magnetic nanocomposite particle disclosed herein. Exemplary magneto-optical devices that can include magnetic nanocomposite particle of the invention include, but are not limited to, a magneto-optical isolator, a magnetic-field sensor, a magnetic photonic crystal, a magnetic data-recording device, magneto-optical circulator, magneto-optical modulator, magneto-optical switch, a magnetometer, as well as other magneto-optical devices known to one skilled in the art, including those disclosed in the '880 Patent.

Still another aspect of the present invention provides a solid substrate comprising a multi-layer of a composition disclosed herein. In particular, one embodiment provides a solid substrate comprising (i) a solid substrate layer and (ii) a plurality layers of a magneto-optic (MO) nanocomposite polymer. Typically, each layer of the MO nanocomposite polymer comprises a plurality of magnetic nanocomposite particles within a polymer host matrix. In some embodiments, the Verdet constant of the solid substrate is at least about 500°/T-m, typically at least about 1,000°/T-m, often at least about 5,000°/T-m, and most often at least about 10,000°/T-m.

In some embodiments, the polymer host matrix comprises PMMA, PS, or any other polymers derived from a monomer having an unsaturated carbon-carbon bond.

The solid substrate layer can be of any material that is suitable for use in an electronic or magneto-optic equipment or devices. In one particular embodiment, the solid substrate layer comprises a material selected from the group consisting of glass, cellulose acetate, polystyrene, polycarbonate, polyacrylate, polymethacrylate, polyester, polyimide, polyamide, polycarbonate, perfluoropolymer, cyclic olefinic copolymer, and a cellulose derived polymer.

Yet in other embodiments, the magnetic nanocomposite particle of the solid substrate comprises a superparamagnetic metal oxide nanocomposite particle. In some instances, the superparamagnetic metal oxide nanocomposite particle comprises (i) a superparamagnetic metal oxide nanoparticle; and (ii) a plurality of organic polymer ligands attached or adsorbed thereto. Still in other embodiments, at least one layer of the MO nanocomposite polymer further comprises a paramagnetic metal, a paramagnetic metal ion, or a combination thereof. Typical paramagnetic metal or metal ion includes a lanthanide metal, or a lanthanide metal ion, or a combination thereof.

Yet in another aspect of the invention provides a solid substrate having a Verdet constant of at least 1,000°/T-m. The solid substrate includes (i) a solid substrate layer and (ii) a magneto-optic (MO) nanocomposite polymer on the surface of the solid substrate layer. Generally, the MO nanocomposite polymer comprises a plurality of superparamagnetic metal oxide nanocomposite particles within a polymer host matrix. Each of the metal oxide nanocomposite particle comprises a superparamagnetic metal oxide nanoparticle having a plurality of organic polymer ligands attached or adsorbed thereto. Typically, the solid substrate comprises a plurality of layers of MO nanocomposite polymer.

The solid substrate having a plurality layers of magneto-optic nanocomposite polymer can be produced using the compositions disclosed herein and using any of the methods known to one skilled in the art, such as spin coating, molding, layer extruding, etc. In one particular embodiment, a solid substrate comprising (i) a solid substrate layer and (ii) a plurality layers of a magneto-optic (MO) nanocomposite polymer is produced by:
  (a) placing a solution of a polymeric composition described herein (i.e., a polymeric composition comprising a plurality of magnetic nanocomposite particles interspersed therein) in a solvent to the surface of said solid substrate layer;
  (b) evaporating the solvent to produce a layer of said polymeric composition described herein;
  (c) placing a solution of a separation film material in a solvent to said layer of polymeric composition described herein produced in said step (b);
  (d) evaporating the solvent to produce a separation film on top of said layer of polymeric composition described herein;
  (e) placing another solution of said polymeric composition described herein in a solvent to said separation film produced in said step (d);
  (f) evaporating the solvent to produce another layer of said polymeric composition described herein; and
  (g) optionally repeating said steps (c) and (f) to produce a desired number of said polymeric composition described herein layers on said solid substrate layer.

In some embodiments, the solid substrate comprises at least 2 layers, typically at least 3 layers, often at least 4 layers, and most often at least 5 layers of the MO nanocomposite polymer.

It should be appreciated that other methods known to one skilled in the art for preparing a multi-layer polymer can also be used. For example, one can use melt-processing via hot-pressing to produce a multi-layer composites as free standing films. Briefly, a multi-layer of a polymer composition of the invention and a separation film are stacked on top of one another. This multi-layer stack is then hot pressed at an elevated temperature and pressure to form a single substrate.

Figure 3:
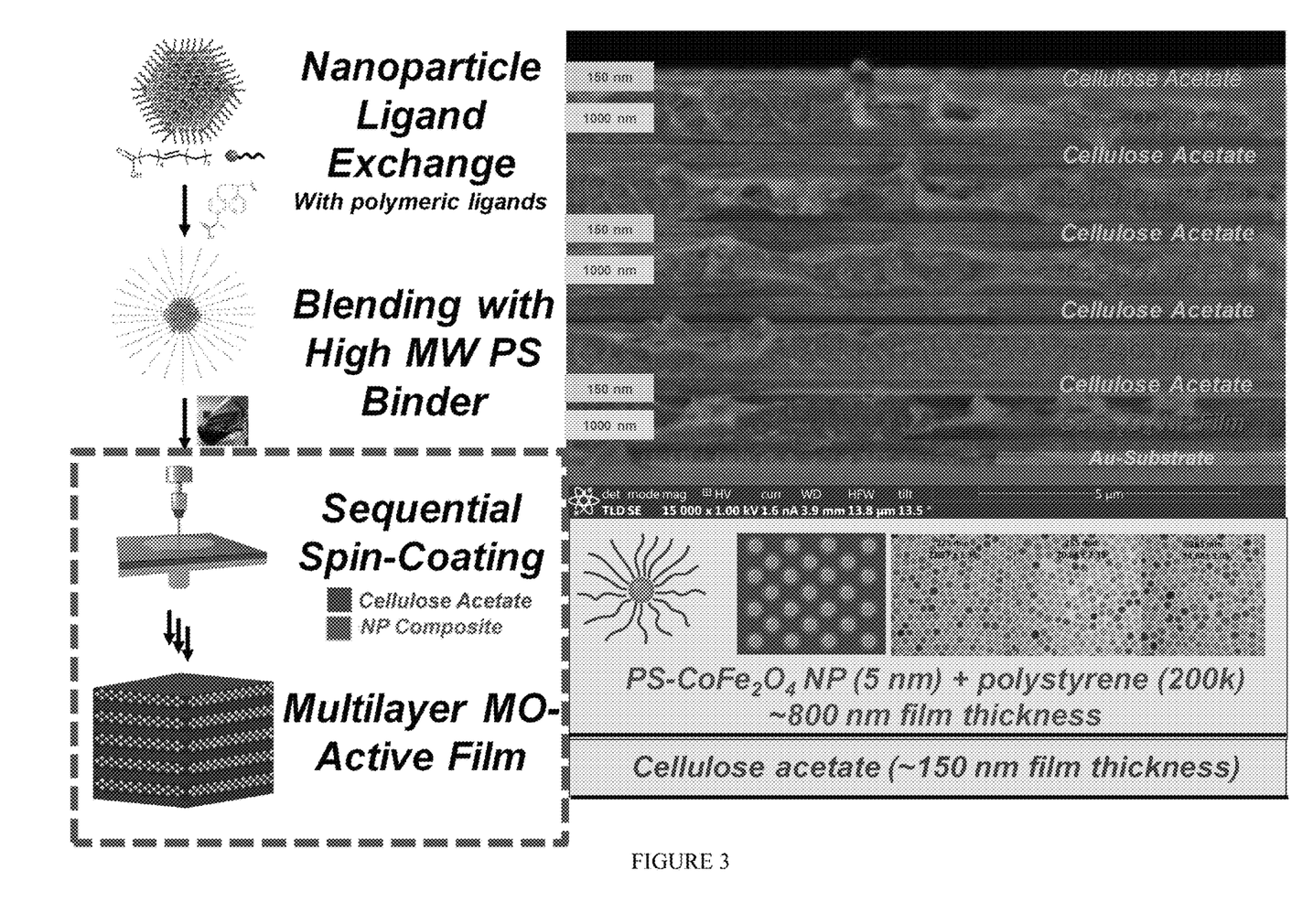
FIG. 3 depicts alternative approach to polymer functionalization of magnetic NPs with end-functional polymeric ligands, and solution processing via spin coating to create layered polymeric-NP films with controllable Faraday rotation.

It should be appreciated that other methods for producing magnetic nanocomposite particles of the invention as well as multi-layered substrates can be readily practiced by one skilled in the art having read the present disclosure. For example, as illustrated in FIG. 3 (left panel), polymeric ligand exchange of magnetic NPs with end-functional polymeric ligands can be used to produce magnetic nanocomposite particles of the invention. A layered polymeric composition of the invention can be obtained using a solution processing via spin coating to create layered polymeric composition with controllable Faraday rotation.

Figure 4:
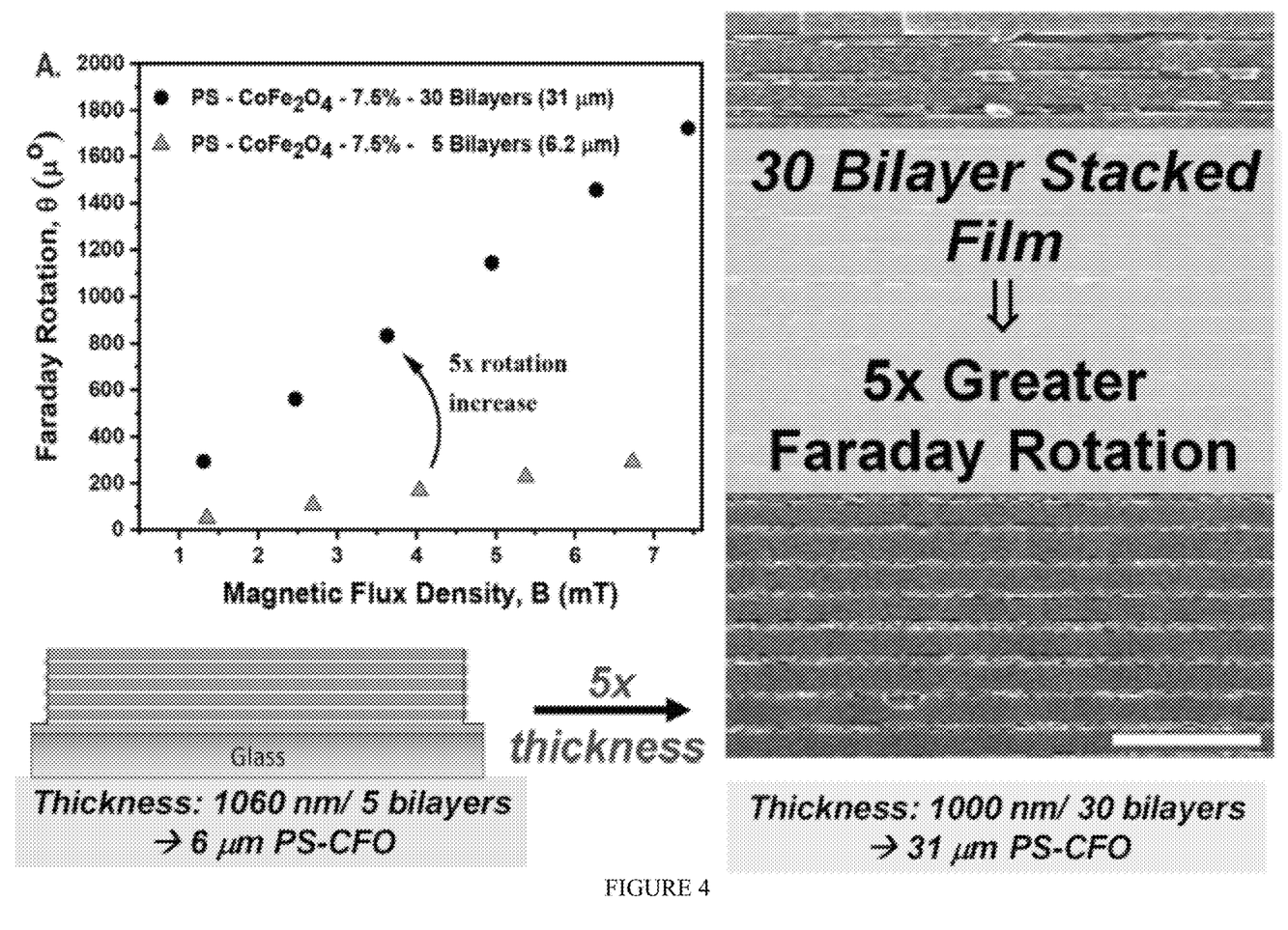
FIG. 4 shows a multi-layered stack film (right) with 30-bilayers of the polymer-magneto-optic NP layer and cellulose acetate. As shown on the left, the Faraday rotation (in units of degrees of rotation) going from 5-bilyaers to 30 bilayers results in a 5-6×increase in Faraday rotation.

FIG. 4 shows a multi-layered stack film (right) with 30-bilayers of the polymer composition of the invention and cellulose acetate as a separation film. As shown on the left, the Faraday rotation (in units of degrees of rotation) going from 5-bilyaers to 30 bilayers results in a 5-6×increase in Faraday rotation. By varying the number of layers, one can readily achieve a wide variety of desired Faraday rotation using compositions and methods disclosed herein.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Nanoparticle Synthesis: The preparation of cobalt ferrite nanocrystals involved a hot injection procedure wherein a stock solution of metal oleates prepared from metal acetylacetonate salts was injected to a hot solvent mixture to facilitate thermal decomposition of the metal precursors and resulting nanoparticle growth over the course of 60 minutes. For particle sizes above 5 nm, a second stock solution of more reactive metal salts was incrementally injected to the flask every 5 minutes after the 60 minute timepoint, enabling further growth onto the pre-existing nanocrystals. Continuing the reaction out to 300 minutes (total reaction time) enabled the synthesis of particles up to 25 nm in size. To prepare lanthanide doped nanocrystals, iron-salts are replaced in both the hot injection and incremental injection stock solutions with the corresponding lanthanide salt in the ratio matching the targeted final material stoichiometry.

Preparation of Metal Oleate Stock Solution: To a flame dried 50 mL TNRBF equipped with a ½" Teflon coated stirbar, reflux condenser, thermocouple, and rubber septa was added cobalt acetylacetonate ($Co(acac)_2$; 0.348 g, 1.35 mmol), iron acetylacetonate ($Fe(acac)_3$; 0.954 g, 3.60 mmol), and oleic acid (8.46 mL, 7.56 g, 26.65 mmol). Subsequently, the contents of the flask were heated to 150° C. at a rate of 20° C./min under Ar, and allowed to stabilize at 150° C. for 15 minutes under Ar. Subsequently, vacuum was applied, promoting the formation of metal-oleate species and facilitating the removal of acetyl acetone over the course of 2 hours. The contents of the flask were then heated to 195° C. under vacuum for 30 minutes before being cooled to room temperature.

Preparation of Incremental Injection Stock Solution: To a 1 dram vial was added cobalt acetylacetonate ($Co(acac)_2$; 0.693 g, 2.70 mmol), iron acetylacetonate ($Fe(acac)_3$; 1.908 g, 5.40 mmol), oleic acid (2.43 mL), and benzyl ether (7.32 mL). Subsequently, the contents of the vial were homogenized by moderate vortex mixing (<2 minutes), sonication (<2 minutes), and heating with a heat gun (~100° C.).

Synthesis of $CoFe_2O_4$ Nanocrystals: To a flame dried 50 mL TNRBF equipped with a ½" Teflon coated stirbar, reflux condenser, thermocouple, and rubber septa was added benzyl ether (10 mL). Subsequently, the flask was wrapped with cotton and the contents of the flask were heated to 295° C. under Ar flow. A heating rate of 20° C./min was employed, and upon reaching 295° C., the metal oleate stock solution was rapidly injected (1.88 mL; 0.30 mmol $Co(OLAC)_2$, 0.60 mmol $Fe(OLAC)_3$). Subsequently, the reaction temperature was allowed to recover to 280° C., before the cotton wrap was removed. For 5 nm particles, the contents of the flask were allowed to react at 280-285° C. for 60 minutes before the heating mantle was removed and the reaction was allowed to cool naturally to room temperature.

For larger nanocrystals, at the 60 minute timepoint, the incremental injection stock solution (0.30 mL; 0.0225 g $Co(acac)_2$, 0.099 mmol; $Fe(acac)_3$ 0.0705 g, 0.198 mmol) was injected to the reaction mixture. The reaction was allowed to proceed for 5 minutes, at which point an additional 0.30 mL of the stock solution was injected. This process was repeated out to the desired timepoint required to facilitate formation of $CoFe_2O_4$ nanoparticles of the desired size.

Nanocrystal Purification: The crude reaction mixture was split into 50 mL centrifuge tubes (4.5 mL each), and the content of each centrifuge tube was subsequently diluted to 45 mL with ethanol (~5 mL crude reaction mixture in 40 mL of EtOH). Subsequently, the slightly cloudy brown/black dispersion was centrifuged at 10000 RPM/10 minutes, followed by decanting of the opaque and brown/yellow supernatant. The black pellet, coating the sides of the centrifuge tube, was subsequently dispersed in 5.0 mL of toluene (for each tube) by vortex mixing, followed by dilution to 45 mL with EtOH. The resulting cloudy brown/black solution (slightly less noticeable than for the first cycle) was centrifuged at 10000 RPM/10 minutes, followed by decanting of the clear and colorless supernatant and dispersion of the resulting black pellet in a minimal amount of DCM. The pellet was subsequently dried by rotary evaporation, followed by drying in vacuo for 12 hours at 50° C.

Composite Preparation

The preparation of polymer/nanoparticle composites for active components in magnetic sensing consisted of three steps: 1) exchange of the native ligands on the nanoparticles for polymer-ligands to produce polymer-coated nanoparticles with improved processing qualities, 2) blending of polymer-coated nanoparticles with high molecular weight polymer binder to prepare a polymer/nanoparticle composite, 3) preparation of nanoparticle/polymer composite based Faraday rotators by sequential spin coating of the composite into multilayer films with cellulose acetate interlayers. The representative procedure below is for the preparation of 0.250 g of a 7.5 wt % nanoparticle loaded polymer/nanoparticle composite, which can facilitate the preparation of up to 50 polymer/nanoparticle layers on a 1"×1" substrate. Table 1 includes a detailed list of conditions for preparation of composites with nanoparticle loadings ranging from 0.1 wt % to 20.0 wt %.

Nanoparticle Ligand Exchange: To a 20 mL scintillation vial was added an amount of synthesized nanoparticles corresponding to the target inorganic content of the final film. Thus, for 250 mg of a composite with 7.5 wt % nanoparticle loading, enough nanoparticles were added to correspond to 18.75 mg of inorganic content. Thus, for a synthesized nanoparticle batch of 50 wt % inorganic content, 37.5 mg of nanoparticle sample was added to the vial (corresponding to 18.75 mg of inorganic content). Subsequently, a stock solution of low-molecular weight polymer ligand in 1,2-dichlorobenzene (PS—COOH, 7500-15,000 g/mol, 20 mg/mL) was added to the vial such that the ratio of polymer ligand to inorganic content was 2:1 (thus, for the above example. 37.5 mg of PS—COOH ligand would be desired, corresponding to 1.875 mL of the ligand stock solution). The contents of the vial were then vortex mixed until homogeneous, followed by heating at 150° C. for 15 minutes in an aluminum heating mantle. After 15 minutes, the vial was removed from the heating mantle and vortex mixed for 30 seconds, before being placed back in the heating mantle at 150° C. This process was repeated six times, for a total of 90 minutes of heating. The dispersion was subsequently probe sonicated for 1 hour, resulting in a homogeneous brown dispersion.

Preparation of Polymer-Nanoparticle Composite: To the same vial as the ligand exchanged nanoparticles were prepared in was subsequently added an appropriate quantity of a high molecular weight polymer stock solution in 1,2-dichlorobenzene (polystyrene, 300,000 g/mol, 150 mg/mL) to correspond to the targeted polymer content less the contribution of the previously added low molecular weight polymer ligand. Thus, in the example highlighted above, a total polymer content of 231.25 mg is desired, for which 37.5 mg is accounted for as the added PS—COOH ligand. Thus, an appropriate amount of high molecular weight polymer stock would be added to correspond to 193.75 mg of polymer (1.29 mL). Subsequently, the contents of the vial were heated to 105° C. in an aluminum heating mantle for 15 minutes. After 15 minutes, the vial was removed from the heating mantle and vortex mixed for 30 seconds, before being placed back in the heating mantle at 150° C. This process was repeated six times, for a total of 90 minutes of heating. The dispersion was subsequently probe sonicated for 1 hour, resulting in a homogeneous brown dispersion. Immediately post sonication, the contents of the vial were precipitated by dropwise addition into 75 mL of methanol atop an AlNiCo magnet, resulting in a brown polymer/nanoparticle pellet. Subsequently, the supernatant was carefully decanted, and the resulting tacky brown polymer/nanoparticle pellet was transferred to a tarred scintillation vial. The contents of the vial were then dried at room temperature in vacuo for 12 hours, before being dried in vacuo at 80° C. for 3 hours.

| Target Nanoparticle Loading (wt %) | Nanoparticle Feed (g) | Polymer Ligand Stock (mL) | High MW Polymer Stock (mL) |
|---|---|---|---|
| 0.10% | 0.00050 | 0.025 | 1.662 |
| 1.00% | 0.00500 | 0.250 | 1.617 |
| 2.50% | 0.01250 | 0.625 | 1.517 |
| 5.00% | 0.02500 | 1.250 | 1.417 |
| 7.50% | 0.03750 | 1.875 | 1.292 |
| 10.00% | 0.05000 | 2.500 | 1.167 |
| 12.50% | 0.06250 | 3.125 | 1.042 |
| 15.00% | 0.07500 | 3.750 | 0.917 |
| 20.00% | 0.10000 | 5.000 | 0.667 |

Feed ratios of synthesized nanoparticles, polymer ligand stock solution, and high molecular weight polymer stock used to prepare composites of varying nanoparticle loadings (nanoparticle inorganic content herein assumed to be 50%).

Sequential Spin Coating of Polymer/Nanoparticle Films: The previously prepared polymer/nanoparticle composite was dispersed in chlorobenzene (150 mg/mL) followed by probe sonication for 1 hour. Subsequently, a thin film of the polymer/nanoparticle composite was spin coated onto the reflective side of a metal-coated (e.g. Au, Al; 150 nm thick metal layer) glass substrate of dimensions 1"×1" at 2000 RPM. After coating, the slide was placed on a hot plate at 100° C. for 2 minutes to ensure complete solvent evaporation. Next, a solution of cellulose acetate in diacetone alcohol (40 mg/mL) was spin coated at 2000 RPM atop the polymer/nanoparticle composite film, followed by evaporation of residual solvent on a hot plate thermostated at 100° C. for 2 minutes. This process was repeated as desired to prepare films ranging from 5 micron to 30 microns in overall thickness.

Melt-Processing of PMMA-CoNPs. Poly(methacrylate)-graft-cobalt nanoparticles (PMMA-CoNPs) bulk samples were prepared as described herein. Samples were hot pressed between two Kapton polyimide sheets (McMaster Carr) with a Carver pellet press held at 145° C. under a pressure ranging from 0.2 to 1.0 metric tons for 3 minutes. The film thickness (from 50 microns to 2 mm) was controlled by utilizing steel Shim-stock (TA Instruments) inserted between the polyimide sheets. After 3 minutes the pressure was released as the temperature of the hot press was decreased to room temperature through a circulation cooling system to prevent stress on the films.

Preparation of polystyrene coated cobalt nanoparticles, dual temperature/high polymer ratio methodology. To a three neck round bottom flask (250 mL, 14/20) with stir bar and condenser was added end-functional amine polystyrene (0.320 g, 0.064 mmol) and end-functional 9,10-dihydro-9-oxa-10-phosphaphenanthrene-10-oxide (DOPO) polystyrene (0.080 g, 0.016 mmol) in dichlorobenzene (40 mL). The flask was flushed with argon for 10 minutes followed by heating to 180° C. using a thermocouple controlled heating mantle. A solution of dicobalt octacarbonyl (0.600 g, 1.75 mmol) in ortho-dichlorobenzene (8 mL) was injected into the hot solution over a period of 5-10 seconds. The evolution of a gas was observed. The reaction was heated at 160° C. for 60 minutes and was cooled to room temperature with continuous stirring under argon. The collected reaction mixture was then precipitated into stirring hexanes (500 mL). The precipitate was collected by sedimentation using a standard AlNiCo magnet followed by decanting of the hexanes phase. The resulting precipitate was then dried in vacuo to give a black powder (yield: 0.400 g) that was soluble in a wide range of nonpolar solvents (e.g., toluene, THF, $CH_2Cl_2$) and was responsive to an external magnetic field. Polymer composition as indicated by TGA was 45-55% by weight.

Ligand exchange followed by ATRP from bulk ferrofluid, i.e., polymerization of MMA. To a scintillation vial was added phosphonic acid based ATRP initiators and Co-g-pS ferrofluid (11 mL, ~130 mg Co-g-pS). The vial was then sonicated using a horn sonicator for 1-4 hrs at RT. Following sonication, the ligand exchange mixture was bubbled with argon for 30 minutes. To a Schlenk flask equipped with stir bar, Cu(I)C$_1$ (0.010 g, 0.1 mmol) and 4,4"-dinonyl-2,2'-dipyridyl (0.0817 g, 0.2 mmol) was added and stoppered with a rubber septum followed by degassing through evacuation and backfilling with argon. In a vial methyl methacrylate (9.43 g, 94.2 mmol) was purged with argon for 30 minutes. Following degassing of solids, MMA was added to solids via syringe and allowed to mix at room temperature for 5 minutes to ensure complete formation of the copper complex. To the homogenous solution, the ligand exchange mixture was added via syringe followed by heating in an oil bath at 60° C. for 60 minutes. Following the reaction, a small pellet (30 mg) was recovered by centrifugation at 6000 rpm for 150 minutes. The pellet was then acid degraded and the polymer isolated followed by characterization by SEC ($M_n$=94000 g/mol, $M_w/M_n$=1.76).

Ligand exchange followed by ATRP, i.e., polymerization of PEGMA. To a Schlenk flask was added phosphonic acid based ATRP initiators and Co-g-pS (0.300 g, ~50% polymer by mass) dissolved in toluene (20 mL). The flask was stoppered and sonicated at –60° C., power level 9 for 180 minutes. Following sonication, the ligand exchange mixture was bubbled with argon for 30 minutes. To a Schlenk flask was added Cu(I)C$_1$ (0.011 g, 0.115 mmol) and 4,4'-dinonyl-2,2'-dipyridyl (0.0940 g, 0.23 mmol) and was stoppered with a rubber septum followed by degassing through evacuation and backfilling with argon. In a vial filtered poly(ethylene glycol) methyl ether methacrylate (PEGMA) (3.5 g, 3.18 mmol)* dissolved in toluene (5 mL) was purged with argon for 30 minutes. Following degassing of solids, PEGMA/toluene solution was added to solids via syringe and mixed at room temperature for 10 minutes to ensure complete formation of the copper complex. Following bubbling for 30 minutes the ligand exchange mixture was sonicated for 20 minutes prior to addition of the PEGMA/toluene/metal complex solution to ensure full dispersion of the cobalt-g-p(MMA) nanoparticles. To the ligand exchange mixture, the monomer/metal complex solution was added via syringe followed by sonication using a horn sonicator for 1-4 hrs at RT. Samples were removed at initial addition of the monomer/metal complex and at 240 minutes to determine conversion by NMR. The remaining solution was diluted with toluene (20 mL) and transferred to an Erlenmeyer flask (125 mL). To the ligand exchange/ATRP mixture was added hexanes in 1 mL portions to a final volume of 16 mL at which point precipitation occurs. The resultant precipitate was sedimented over a magnet and the supernatant was decanted. The remaining solid was redissolved in DCM and transferred to a vial where the solvent was removed in vacuo. The resultant film was dissolved in THF (7 mL) and transferred to a small volume centrifuge tube (10 mL). The tube was placed next to a magnet for 30 minutes followed by centrifugation at 11000 rpm for 30 minutes. Following centrifugation, the black, opaque supernatant was decanted, leaving a black pellet at the bottom of the centrifuge tube. The pellet was dissolved in DCM and transferred to a vial, dried in vacuo, yielding a black waxy solid (200 mg, yield ~60%).

To a dram vial was added CDCl$_3$ (2 mL) and Co-g-p (MMA-b-PEGMA) (0.3 ml for kinetic samples or 60 mg for the recovered solid). The solution was sonicated for 10 minutes to ensure redispersion of the cobalt nanoparticles. To the solution, Conc HC$_1$ (0.25 ml) was added followed by sonication until the solution turned a light cloudy blue. To the solution was added K$_2$CO$_3$ (~50 mg, until no bubbling was observed in the solution) followed by addition of MgSO$_4$ to remove any water present in the solvent. During the addition of K$_2$CO$_3$ and MgSO$_4$, a pink solid was observed and was not soluble in CDCl$_3$ or THF. After quenching and drying the CDCl$_3$ solution went from cloudy to clear at which point it was passed through an alumina plug prior to NMR or SEC characterization. SEC of final solid: $M_n$=14000 g/mol, $M_w/M_n$=1.15. $^1$H NMR of final solid (300 MHz, CDCl$_3$) δ 3.8-3.6 (b, CH$_3$, CH$_2$), δ 2.4-1.2 (bm, CH$_2$), δ 1.05-0.7 (bm, CH$_3$). $^1$H NMR of kinetic sample (300 MHz, CDCl$_3$) δ 6.15 (bs, CH), δ5.55 (bs, CH), δ 3.8-3.6 (b, CH$_3$, CH$_2$), δ 2.4-1.2 (bm, CH$_2$), δ 1.05-0.7 (bm, CH$_3$).

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A solid substrate comprising (i) a solid substrate layer and (ii) a plurality of thin layers of a polymeric composition, wherein:
   each thin layer of said polymeric composition is separated by a separation film; and
   the polymeric composition comprising a plurality of magnetic nanocomposite particles interspersed therein, wherein each of said magnetic nanocomposite particle comprises a magnetic nanoparticle having a plurality of organic polymer ligands attached to its surface, and wherein said polymeric composition has a Verdet constant of at least 5,000°/T-m at 1310 nm wavelength.

2. The solid substrate of claim 1, wherein said solid substrate layer comprises a material selected from the group consisting of glass, cellulose acetate, polystyrene, polycarbonate, polyacrylate, polymethacrylate, polyester, polyimide, polyamide, polycarbonate, perfluoropolymer, cyclic olefinic copolymer, and a cellulose derived polymer.

3. The solid substrate of claim 1, wherein each thin layer of said polymeric composition has a thickness from about 2 nm to about 2 mm.

* * * * *